United States Patent
Gates et al.

(10) Patent No.: US 6,910,669 B2
(45) Date of Patent: Jun. 28, 2005

(54) SPARE TIRE BRACKET

(75) Inventors: David L. Gates, 3508 Routh St., Dallas, TX (US) 75219-4730; Monte Morrish, Mesquite, TX (US)

(73) Assignee: David L. Gates, Dallas, TX (US)

( * ) Notice: Subject to any disclaimer, the term of this patent is extended or adjusted under 35 U.S.C. 154(b) by 38 days.

(21) Appl. No.: 10/660,979

(22) Filed: Sep. 12, 2003

(65) Prior Publication Data

US 2005/0056763 A1 Mar. 17, 2005

(51) Int. Cl.[7] ............................................. A47B 97/00
(52) U.S. Cl. ................ 248/503; 224/42.13; 224/42.21; 224/509; 248/201; 403/180; 403/184; 403/301; 403/306
(58) Field of Search ................................. 248/503, 500, 248/201, 202.1, 205.1; 403/180, 182, 183, 184, 301, 306, 316; 224/519, 509, 557, 553, 42.13, 42.14, 45.21, 42.24

(56) References Cited

U.S. PATENT DOCUMENTS

| | | | | |
|---|---|---|---|---|
| 4,771,925 A | * | 9/1988 | Stoffler et al. | 222/207 |
| 4,771,926 A | | 9/1988 | Anderson et al. | |
| 5,137,192 A | * | 8/1992 | Sheridan et al. | 224/42.13 |
| 5,806,736 A | * | 9/1998 | Kincart | 224/509 |
| 6,098,855 A | * | 8/2000 | Grabowski et al. | 224/42.2 |
| 6,427,885 B1 | * | 8/2002 | Dexel | 224/42.24 |
| 2004/0079778 A1 | * | 4/2004 | Wilkens | 224/509 |

* cited by examiner

*Primary Examiner*—Ramon O Ramirez
(74) *Attorney, Agent, or Firm*—Slater & Matsil, L.L.P.

(57) ABSTRACT

A bracket adapted to fit through a wheel of a spare tire for a vehicle is provided. The bracket includes a first plate portion, a first member, a second plate portion, and a second member. The first plate portion has at least two stud holes formed therethrough and arranged in a pattern corresponding to a wheel-stud pattern for at least one vehicle. The first member extends from the first plate portion. At least part of an exterior surface of the first member has a cylindrical shape. The first member has a first threaded portion. The second member extends from the second plate portion. The second member has a second threaded portion. The first threaded portion is adapted to mate with the second threaded portion. The bracket may be includes in a kit, wherein the kit includes a container holding bracket.

22 Claims, 5 Drawing Sheets

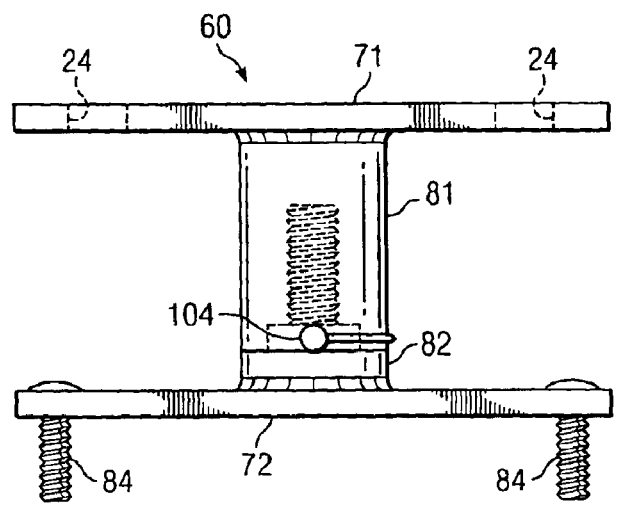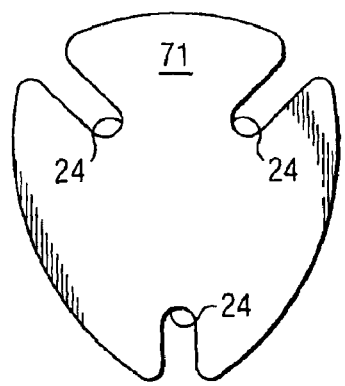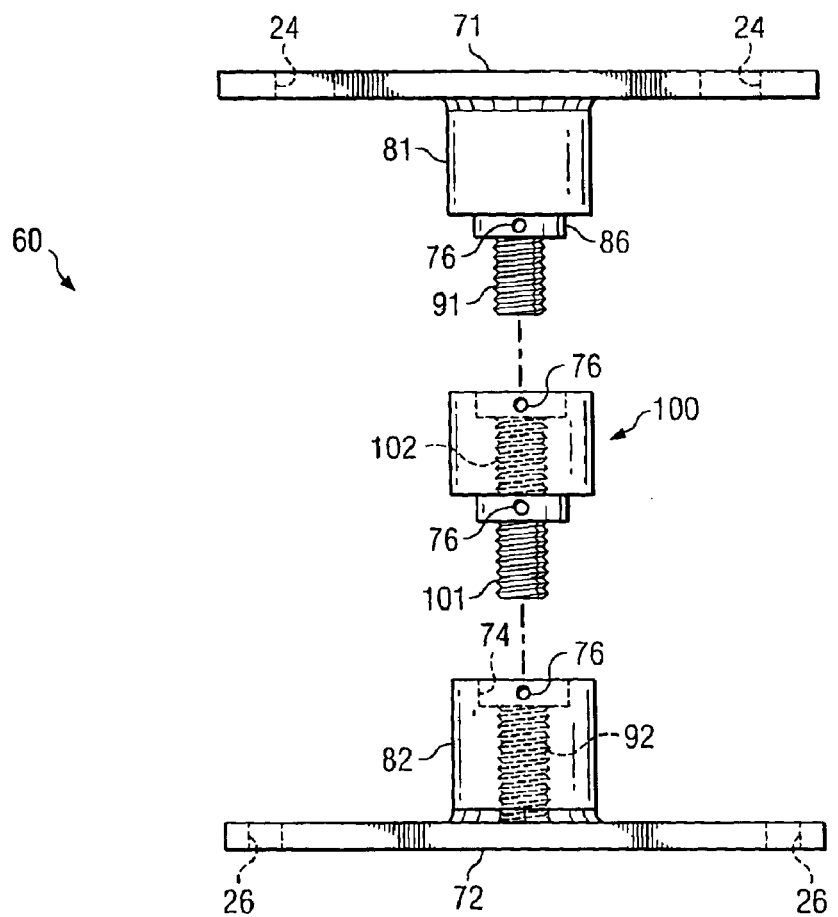

SPARE TIRE BRACKET

TECHNICAL FIELD

The present invention generally relates to brackets that attach to and/or through a wheel of a spare tire on a vehicle.

BACKGROUND

Many off-road vehicles and sport-utility vehicles (e.g., Jeep, Bronco, Tahoe, Hummer) have a spare tire mounted on the rear or side of the vehicle. It is sometimes desirable to mount a gas can or other equipment onto the spare tire and/or the spare tire support member. For example, Con-Ferr Manufacturing Company, Inc. of Burbank, Calif. sells a gas-can-holder bracket designed for attaching a gas can to an exterior of a vehicle. Con-Ferr also sells an intermediate bracket that is designed for fastening the gas-can-holder bracket to a spare tire support member on a vehicle. FIGS. 1 and 2 illustrates a prior art intermediate bracket 20, such as those sold by Con-Ferr. The prior art intermediate bracket 20 has two parts 21, 22, which are adapted to fit together as shown in FIG. 2. A first part 21 has stud holes 24 adapted to mount on a spare tire support member (not shown in FIGS. 1 and 2, but see e.g., FIG. 3 discussed below). A second part 22 has attachment holes 26 adapted to be aligned with attachment holes in a gas-can-holder bracket (not shown in FIGS. 1 and 2, but shown in FIG. 3 discussed below). Each part 21, 22 has a channel portion 28 with a U-shaped cross-section.

One of the drawbacks to the prior art intermediate bracket 20 shown in FIGS. 1 and 2 is that the channel portions 28 are too large to fit though the center hole of some wheels, such as factory alloy wheels. Often, factory alloy wheels (i.e., aluminum alloy OEM wheels available from the car manufacturer/dealer) have a much smaller diameter center hole than aftermarket alloy wheels or custom wheels. Hence, there is a need for an intermediate bracket that can fit through the center hole of a larger variety of wheels, including factory alloy wheels, for example.

Also, the length of the channel portions 28 on the prior art intermediate bracket 20 shown in FIGS. 1 and 2 are often too long for some applications. For example, some factory alloy wheels are narrower than many of the aftermarket custom wheels. The prior art intermediate bracket 20 may be shortened by cutting off end portions from the channel portions. However, doing so may require the use of specialized tools and it is a permanent modification to the intermediate bracket 20. Furthermore, having the prior art intermediate bracket 20 assembled at its maximum length is not as structurally stable as a shorter assembly (as in FIG. 2). Thus, it would be highly desirable to have an intermediate bracket that provides more versatility in lengths, without compromising the structural integrity and without requiring special tools or permanent modifications.

Referring to FIG. 2, the fastener bolt 30 may become loose, or even come off, due to excessive vibrations, which are not uncommon on off-road vehicles or vehicles having off-road tires. If this fastener bolt 30 becomes loose or comes off, the assembly of the intermediate bracket 20 becomes structurally unstable and the channel portions 28 are permitted to move relative to each other. Hence, a gas can held by an attached gas-can-holder bracket is able to move relative to the spare tire support member. The safety concerns of a five gallon gas can, for example, shaking or shifting position on the exterior of a vehicle, or even falling off while the vehicle is moving, are serious. Thus, a need exists for a more secure and structurally stable method of securing a gas can, for example, (or any other container) to a spare tire support member.

SUMMARY OF THE INVENTION

The problems and needs outlined above are addressed by the present invention. In accordance with one aspect of the present invention, a bracket adapted to fit through a wheel of a spare tire for a vehicle, is provided. The bracket includes a first plate portion, a first member, a second plate portion, and a second member. The first plate portion has at least two stud holes formed therethrough and arranged in a pattern corresponding to a wheel-stud pattern for at least one vehicle. The first member extends from the first plate portion. At least part of an exterior surface of the first member has a cylindrical shape. The first member has a first threaded portion. The second member extends from the second plate portion. The second member has a second threaded portion. The first threaded portion is adapted to mate with the second threaded portion.

In preferred aspects of the invention, each of the stud holes may be adapted to accept a stud having a diameter approximately equal to a diameter for a wheel stud of a standardized stud size of the vehicle. The stud holes are preferably located at about a same radial distance from the first member. At least one of the stud holes may intersect with an edge of the first plate portion. The first member preferably extends substantially perpendicular from the first plate portion. The second member preferably extends substantially perpendicular from the second plate portion. The cylindrical shaped part of the first member preferably has an outer diameter adapted to fit through a center hole of a factory alloy wheel, for example. The second plate portion may have at least two attachment holes formed in a pattern adapted to substantially align with attachment holes on a container holder. The first member is preferably welded to the first plate portion. The second member is also preferably welded to the second plate portion.

The first threaded portion may extend from the first member and the first threaded portion may include male threads formed thereon. Also, the second threaded portion may extend into the second member and the second threaded portion may include female threads formed therein. The first member may have a shoulder portion located at a proximate end of the first threaded portion, wherein a distal end of the second member has a recessed portion formed therein, and wherein the shoulder portion is adapted to mate with the recessed portion. The first member may have a first pin hole formed therein at the shoulder portion, and the second member may have a second pin hole formed therein at the recessed portion, wherein the first pin hole is adapted to be substantially aligned with the second pin hole at certain mated positions of the second member relative to the first member. In alternative, the second threaded portion may extend from the second member and the second threaded portion may include male threads formed thereon. And, the first threaded portion may extend into the first member and the first threaded portion may include female threads formed therein.

In alternative aspects of the invention, the second threaded portion may extend from the second member and the second threaded portion may include male threads formed thereon. Also, the first threaded portion may extend into the first member and the first threaded portion may include female threads formed therein. The second member may have a shoulder portion located at a proximate end of the second threaded portion, wherein a distal end of the first member has a recessed portion formed therein, and wherein the shoulder portion is adapted to mate with the recessed portion. The first member may have a first pin hole formed therein at the recessed portion, wherein the second member has a second pin hole formed therein at the shoulder portion, and wherein the first pin hole is adapted to be substantially aligned with the second pin hole at certain mated positions of the second member relative to the first member.

The bracket may further include an optional extension member. The extension member has a first end and a second end. The extension member has a third threaded portion at the first end and a fourth threaded portion at the second end. The third threaded portion is adapted to mate with the first threaded portion. The fourth threaded portion is adapted to mate with the second threaded portion.

In accordance with another aspect of the present container holder kit attachable to a spare tire support member on a vehicle. The spare tire support member has wheel studs extending therefrom. The wheel studs are adapted to engage with lug nuts to retain a wheel of a spare tire on the spare tire support member. The wheel studs are arranged in a pattern corresponding to a wheel stud hole pattern of the wheel. The kit includes a container holder bracket and an intermediate bracket. The container holder bracket is adapted to retain a container (e.g., a gas can). The intermediate bracket includes a first plate portion, a first member, a second plate portion, and a second member. The first plate portion has a first set of holes formed therethrough. The first set of holes are arranged so that the wheel studs on the spare tire support member can pass through the first set of holes. The first plate portion is adapted to be attached to the spare tire support member using the wheel studs and lug nuts when the intermediate bracket is operably installed. The first member extends from the first plate portion. At least part of an exterior surface of the first member has a cylindrical shape. The first member is adapted to fit through a center hole of the wheel when the intermediate bracket is operably installed. The first member has a first threaded portion. The second plate portion is adapted for attachment to the container holder. The second member extends from the second plate portion. The second member has a second threaded portion. The first threaded portion is adapted to mate with the second threaded portion. The attachment points on the second plate portion may be attachment holes formed in the second plate portion. In alternative, the attachment points on the second plate portion may be attachment studs extending from the second plate portion.

DESCRIPTION OF THE DRAWINGS

The following is a brief description of the drawings, which show illustrative ents of the present invention and in which:

FIG. 8 is an assembled side view of an intermediate bracket in accordance with a second embodiment of the present invention;

FIG. 9 shows a first plate portion in accordance with a third embodiment of the present invention; and FIG. 10 is an unassembled side view of the intermediate bracket in accordance with a fourth embodiment of the present invention.

DETAILED DESCRIPTION OF ILLUSTRATIVE EMBODIMENTS

Figure 1:
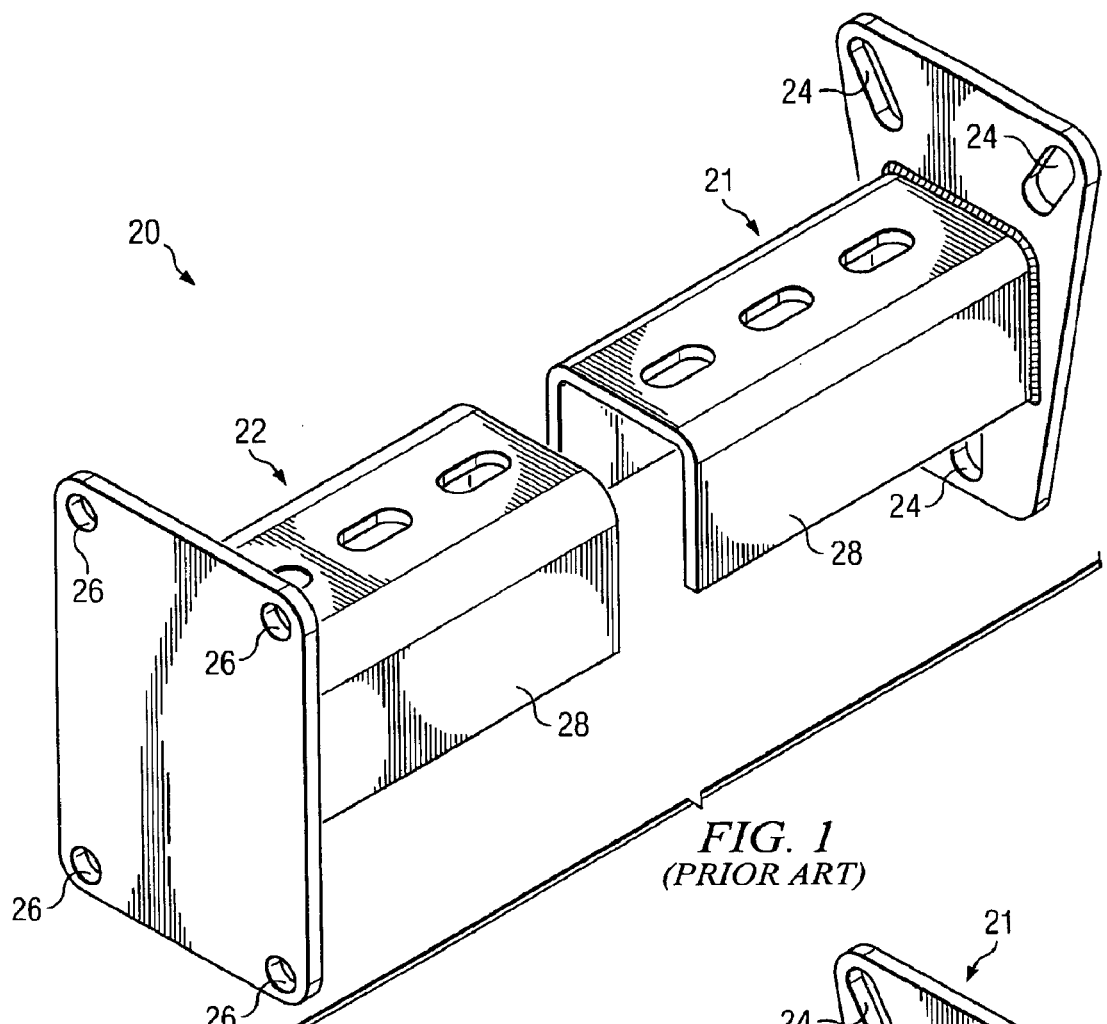
FIG. 1 is an unassembled perspective view of a two-part intermediate bracket of the FIG. 2 is an assembled perspective view of the bracket of FIG. 1.
Figure 2:
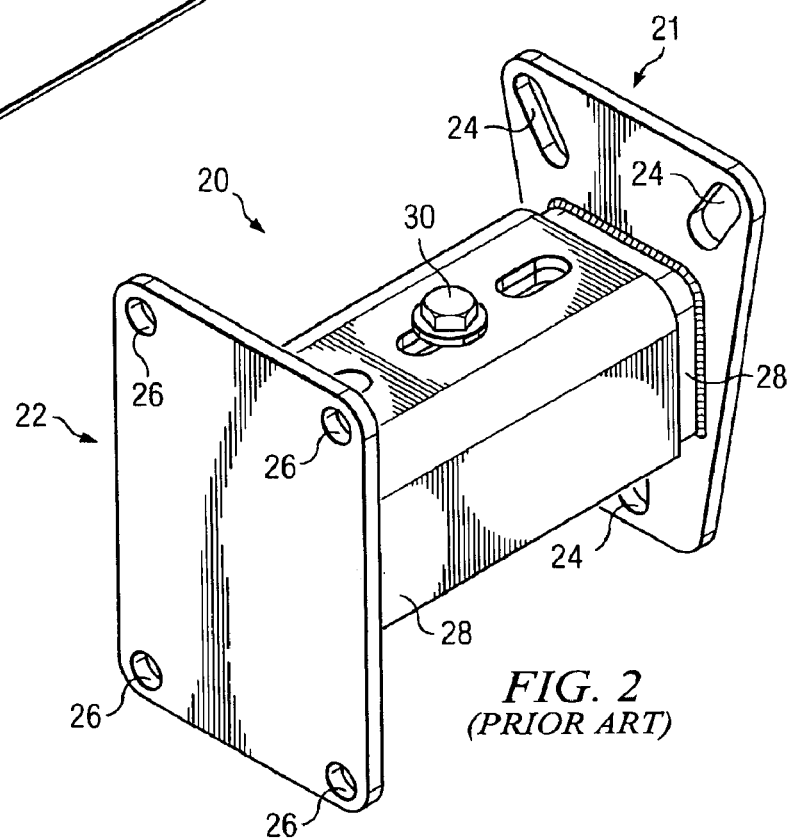

Referring now to the drawings, wherein like reference numbers are used herein to designate like elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Figure 3:
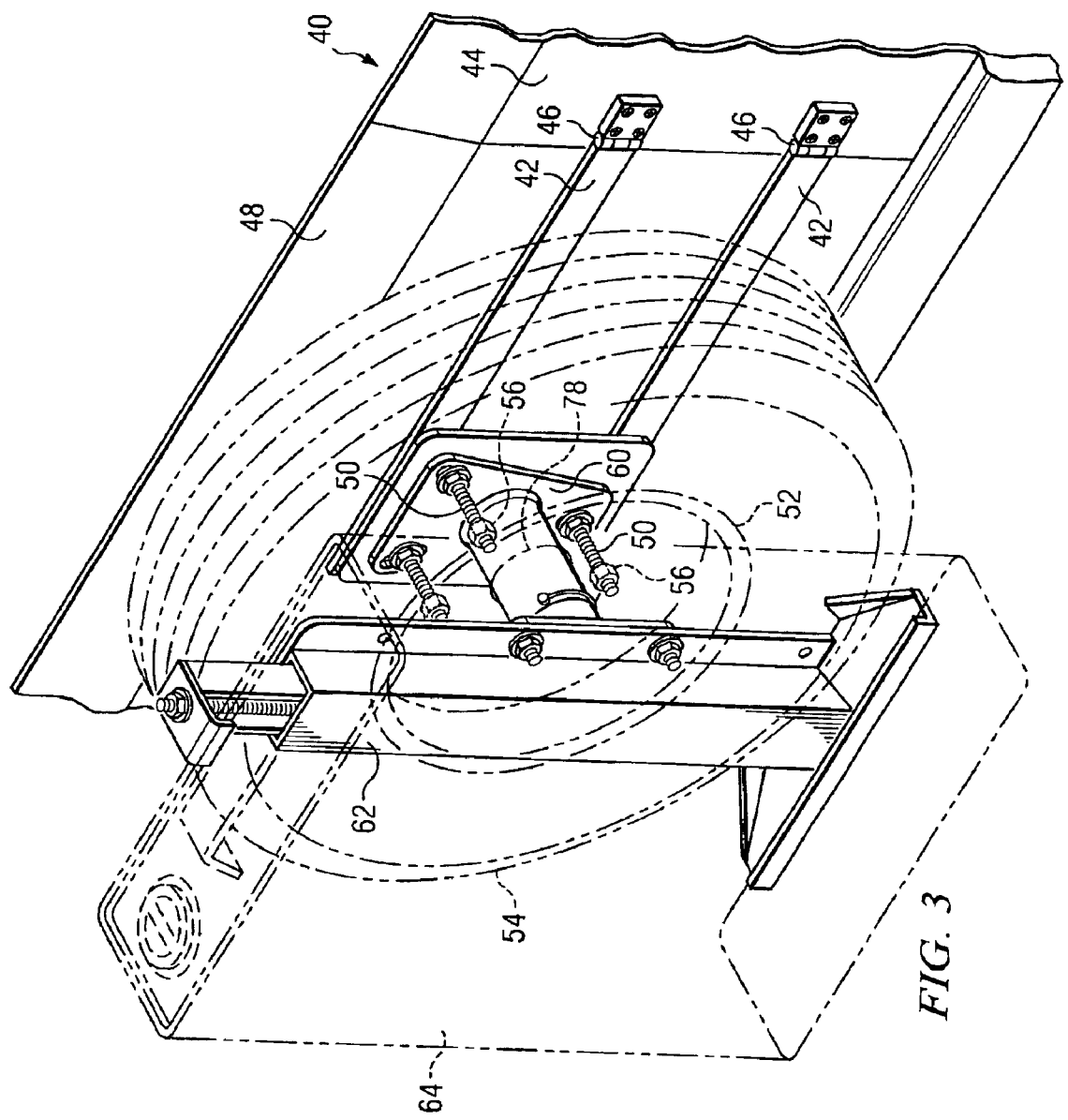
FIG. 3 is perspective view showing a rear portion of vehicle having a first embodiment of the present invention attached thereto.

Embodiments of the present invention generally relate to brackets that attach to or through a wheel of a spare tire on a vehicle. An embodiment of the present invention may provide an improved intermediate bracket that may be used to attach a container to a spare tire support member, for example. FIGS. 3–7 illustrate a first embodiment of the present invention, which will be discussed first FIG. 3 is a perspective view showing a rear portion of a vehicle 40 having the first embodiment attached thereto. In FIG. 3, a spare tire support member 42 is shown attached to a rear panel 44 of the vehicle 40. The spare tire support member 42 of FIG. 3 has hinges 46 to allow it to swing away providing clearance for a tailgate 48. However this is just one example, as there are many different configurations and styles of spare tire support members. In an alternative embodiment, the support member 42 may be integrated into a tailgate 48, into a vehicle door, into a vehicle body panel, or into any part of the vehicle frame, for example. Also, the support member 42 may be removably or permanently attached to the bumper, the vehicle frame, or to some other part of the vehicle, for example. The spare tire support member 42 of FIG. 3 has wheel studs 50 extending from it, which are used to retain the wheel 52 of the spare tire 54. The wheel 52 with the spare tire 54 thereon is shown in phantom lines in FIG. 3, for purposes of illustration. The wheel studs 50 are arranged in a pattern corresponding to the wheel stud hole pattern of the wheel 52. Lug nuts 56 may be used to retain the wheel 52 on the spare tire support member 42 via the wheel studs 50. The lug nuts 56 are also shown in phantom lines in FIG. 3 to better illustrate the wheel studs 50 extending from the spare tire support member 42.

In FIG. 3, an intermediate bracket 60 in accordance with the first embodiment is shown attached to the vehicle 40 between the wheel 52 and the spare tire support member 42. A gas-can-holder bracket 62 (as provided by Con-Ferr Manufacturing Company, Inc., for example) is shown attached to the spare tire support member 42 via the intermediate bracket 60. A five-gallon, metal gas can 64 is shown in phantom lines in FIG. 3 for purposes of illustration. The gas can 64 is being retained by the gas-can-holder bracket 62. Although a gas can 64 is shown as an example, the gas-can-holder bracket 62 may be used to retain other objects or containers. Furthermore, although a specific gas-can-holder bracket 62 is shown in FIG. 3 attached to the intermediate bracket 60, other types of container holder brackets adapted to hold other containers may be attached to the intermediate bracket 60 as well. Also, as will become more apparent with the description of the intermediate bracket 60 below, the intermediate bracket 60 may be adapted to attach to or retain other types/configurations of brackets and/or the intermediate bracket 60 may be adapted to retain a container itself. With the benefit of this disclosure, one of ordinary skill in the art will likely realize may different variations on the intermediate bracket 60 and many different uses.

Figure 4:
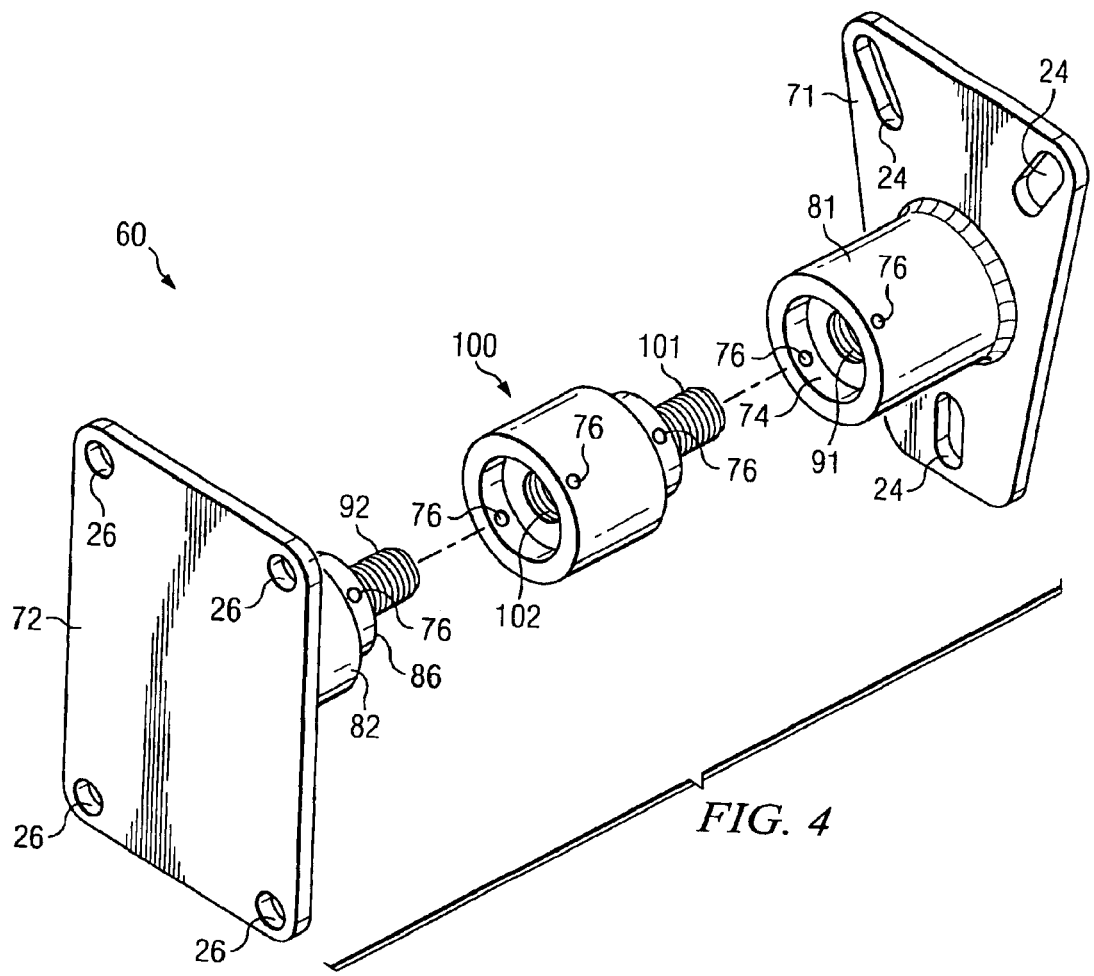
FIG. 4 is an unassembled perspective view of the intermediate bracket of the first embodiment.
Figure 6:
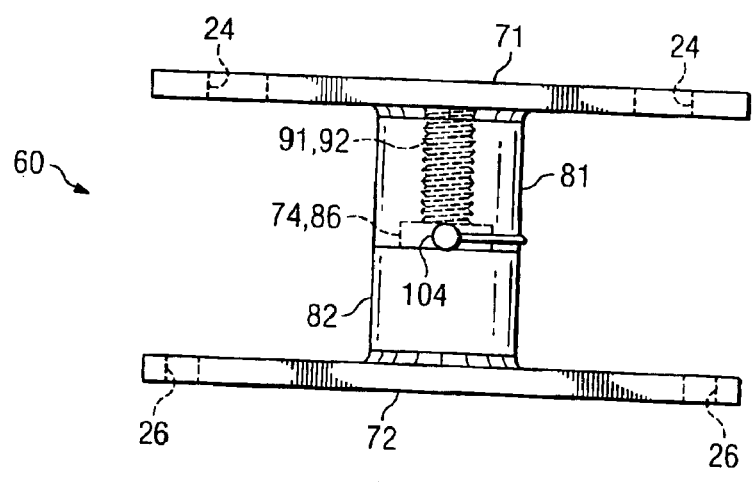
FIG. 6 is an assembled side view of the intermediate bracket of the first embodiment.
Figure 5:
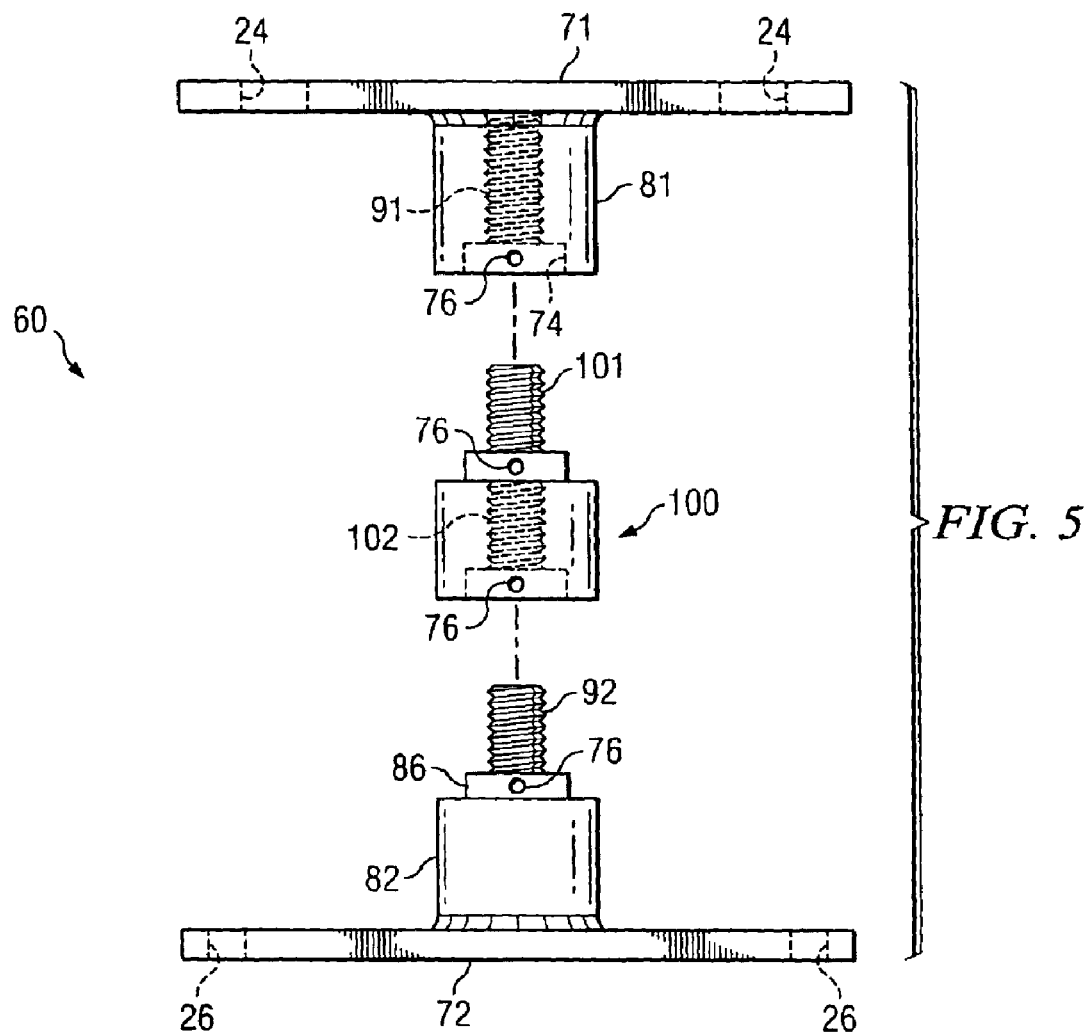
FIG. 5 is an unassembled side view of the intermediate bracket of the first embodiment.

FIGS. 4–6 show the intermediate bracket 60 of FIG. 3 in more detail. FIG. 4 is a disassembled perspective view of the intermediate bracket 60. FIG. 5 is a side view of the intermediate bracket 60 disassembled. FIG. 6 is a side view of the intermediate bracket 60 in an assembled configuration. The intermediate bracket 60 has a first plate portion 71 with a first member 81 extending therefrom. Preferably, the first member 81 extends substantially perpendicularly from the first plate portion 71. The first plate portion 71 of the first embodiment is generally triangular shaped; however, in other embodiments the shape of the first plate portion 71 may differ (e.g., generally round, square, rectangular, arbitrary-shaped, etc.). The first plate portion 71 of the first embodiment has three elongated stud holes 24 formed therein. These stud holes 24 are elongated so that they may be aligned with wheel studs 50 of differing patterns or arrangements for a variety of vehicles. The stud holes 24 may have other shapes as well, including (but not limited to) being round, oval, square, rectangular, or arbitrarily shaped, for example. The number of stud holes 24 formed in the first plate portion 71 may vary as well (e.g., two, four, five, six, etc.). In another embodiment (not shown), a first plate portion 71 may have two different sets of stud holes 24 having two different patterns for mating with at least two different patterns of wheel studs, for example.

The first member 81 is welded to the first plate portion 71 in the first embodiment. However, the first member 81 may be attached to the first plate portion 71 in a variety of different ways, including (but not limited to) being: bolted, adhered, riveted, screwed, fused, welded, or any combination thereof, for example. Also, the first member 81 may be integral with the first plate portion 71. For example, the first plate portion 71 and the first member 81 may be formed together in a casting and/or forging process. Alternatively, the first plate portion 71 and the first member 81 may be machined from a single billet of material, for example. With the benefit of this disclosure, one of ordinary skill in the art will likely realize many other possible ways to make and form the first plate portion 71 and the first member 81 assembly.

The first member 81 of the first embodiment has a first threaded portion 91, which in this case is a threaded hole formed in the first member 81. The first member 81 of the first embodiment also has a recessed portion 74 formed in its distal end. Also at the distal end of the first member 81, it may have a first pin hole 76 formed therein or therethrough, as shown in FIGS. 4 and 5. At least part of the first member 81 preferably has a cylindrical-shaped exterior surface, as shown in FIG. 4. The cylindrical shape is preferred because it allows for a maximum outer diameter of the first member for fitting through a round center hole 78 in a wheel 52 (see FIG. 3), as most wheels have a center hole that is round. However, in other embodiments (not shown), an exterior surface of the first member 81 may have any of a variety of cross-section shapes, including (but not limited to): square, oval, hexagonal, or octagonal, for example.

The intermediate bracket 60 of the first embodiment also has a second plate portion 72 with a second member 82 extending therefrom. Preferably, the second member 82 extends substantially perpendicular from the second plate portion 72. The second plate portion 72 may be attached to or formed with the second member 82 in a variety of ways (e.g., separate pieces permanently or removably coupled together, integrally formed), as described above with respect to the assembly of the first plate portion 71 and the first member 81.

The second plate portion 72 of the first embodiment is generally square shaped; however, in other embodiments the shape of the first plate portion may differ (e.g., generally round, triangular, rectangular, arbitrarily-shaped, etc.). The second plate portion 72 of the first embodiment has four attachment holes 26 formed therethrough. These attachment holes 26 in this case are arranged for alignment with corresponding attachment holes on the gas-can-holder bracket 62, as shown in FIG. 3, for example. In other embodiments, however, the second plate portion 72 may vary. For example, the second plate portion 72 may have studs 84 extending therefrom, as shown in FIG. 8. The second plate portion 72 may have other types of attachment points thereon, such as clamps, fasteners, clips, screws, bolts, pins, slots, snaps, straps, or any combination thereof, for example. Furthermore, the second plate portion 72 may be simply a plate needing modification by the buyer for providing attachment to a container or a container holder bracket, for example. The second plate portion 72 itself may also include a container holder formed integrally therewith. With the benefit of this disclosure, one of ordinary skill in the art will likely realize many other possibly configurations of the second plate portion 72.

The second member 82 is welded to the second plate portion 72 in the first embodiment. However, the second member 82 may be attached to the second plate portion 72 in a variety of different ways, including (but not limited to) being: bolted, adhered, riveted, screwed, fused, welded, or any combination thereof, for example. Also, the second member 82 may be integral with the second plate portion 72. For example, the second plate portion 72 and the second member 82 may be formed together in a casting and/or forging process, for example. Alternatively, the second plate portion 72 and the second member 82 may be machined from a single billet of material, for example. With the benefit of this disclosure, one of ordinary skill in the art will likely realize many other possible ways to make and form the second plate portion 72 and the second member 82 assembly.

The second member 82 of the first embodiment has a second threaded portion 92, which in this case is a threaded shaft extending from a distal end of the second member 82. The second member 82 of the first embodiment also has a shoulder portion 86 formed at the base of the second threaded portion 92. Also at the shoulder portion 86 of the second member 82, it may have a second pin hole 76 formed therein or therethrough, as shown in FIGS. 4 and 5. At least part of the second member 82 preferably has a cylindrical-shaped exterior surface, as shown in FIG. 4. The cylindrical shape is preferred because it allows for a maximum outer diameter of the second member 82 for fitting through a round center hole in a wheel. However, in other embodiments (not shown), an exterior surface of the second member 82 may have any of a variety of cross-section shapes, including (but not limited to): square, oval, hexagonal, or octagonal, for example.

The first threaded portion 91 is adapted to threadedly mate with the second threaded portion 92. Also, in the shoulder portion 86 of the second member 82 is adapted to fit in the recessed portion 74 of the first member 81.

FIGS. 4 and 5 show an optional extension member 100, which may be used to adapt the intermediate bracket 60 to a wider wheel, for example. Also note that the lengths of the first member 81, the extension member 100, and/or the second member 82 may be varied to provide optimal fit for certain wheels or certain wheel parameters. The extension member 100 has threaded portions 101, 102 corresponding to the threaded portions 91, 92 found on the first and second members 81, 82. Hence, the first member 81 may be mated to the second member 82 via the extension member 100.

Figure 7:
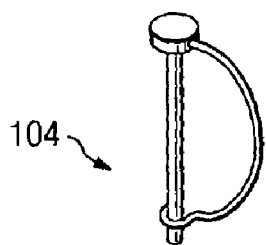
FIG. 7 shows a safety pin of the first embodiment.

As illustrated in FIG. 6, a safety pin 104 may be inserted through the pin holes 76 formed in the first and second members 81, 82. An example safety pin 104 is shown in FIG. 7. Other pin configurations may be used. The use of a safety pin 104 and having pin holes 76 for the safety pin 104 are preferred, but optional.

Also, note that the shoulder portion 86 and the recessed portion 74 shown in FIG. 46 are optional features, which may not be present in other embodiments. However, the use of the shoulder portion 86 and recessed portion 74 are preferred to provide added strength and rigidity to the assembled structure of the intermediate bracket 60.

FIG. 8 shows an intermediate bracket 60 in accordance with a second embodiment of the present invention. The intermediate bracket 60 of the second embodiment (see FIG. 8) is similar to the first embodiment (see FIGS. 4–6). In the second embodiment, the first member 81 is longer and the second member 82 is shorter, with respect to the first embodiment. Also, the second plate portion 72 of the second embodiment has attachment studs 84 extending therefrom rather than attachment holes, as compared the first embodiment.

FIG. 9 shows a first plate portion 71 in accordance with a third embodiment of the present invention (the other portions of the intermediate bracket 60 are not shown in FIG. 9 for purposes of illustration). The first plate portion 71 of the third embodiment has stud holes 24, which intersect with edges of the first plate portion 71.

FIG. 10 shows an intermediate bracket 60 in accordance with a fourth embodiment of the present invention. The fourth embodiment (see FIG. 10) is similar to the first embodiment (see FIG. 5), except the male and female threaded portions 91, 92 have been reversed in their configuration with respect to the first and second members 81, 82.

It will be appreciated by those skilled in the art having the benefit of this disclosure that embodiments the present invention provide a spare tire bracket. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such modifications, changes, rearrangements, substitutions, alternatives, design choices, and embodiments.

What is claimed is:

1. A bracket adapted to fit through a wheel of a spare tire for a vehicle, comprising:
    a first plate portion having at least two stud holes formed therethrough and adapted to be arranged in a pattern corresponding to a wheel-stud pattern for at least one vehicle;
    a first member extending from the first plate portion, wherein at least part of an exterior surface of the first member has a cylindrical shape, and wherein the first member has a first threaded portion;
    a second plate portion; and
    a second member extending from the second plate portion, wherein the second member has a second threaded portion wherein the first threaded portion is adapted to mate with the second threaded portion, and wherein the second plate portion has at least two attachment holes formed in a pattern adapted to substantially align with attachment holes on a container holder.

2. The bracket of claim 1, where the first threaded portion extends from the first member and the first threaded portion includes male threads formed thereon, and wherein the second threaded portion extends into the second member and the second threaded portion includes female threads formed therein.

3. The bracket of claim 2, wherein the first member has a shoulder portion located at a proximate end of the first threaded portion, wherein a distal end of the second member has a recessed portion formed therein, and wherein the shoulder portion is adapted to mate with the recessed portion.

4. The bracket of claim 3, wherein the first member has a first pin hole formed therein at the shoulder portion, wherein die second member has a second pin hole formed therein at the recessed portion, and wherein the first pin hole is adapted to be substantially aligned with the second pin hole at certain mated positions of the second member relative to the first member.

5. The bracket of claim 1, wherein the second threaded portion extends from the second member and the second threaded portion includes male threads formed thereon, and wherein the first threaded portion extends into the first member and the first threaded portion includes female threads formed therein.

6. The bracket of claim 5, wherein the second member has a shoulder portion located at a proximate end of the second threaded portion, wherein a distal end of the first member has a recessed portion formed therein, and wherein the shoulder portion is adapted to mate with the recessed portion.

7. The bracket of claim 6, wherein the first member has a first pin hole formed therein at the recessed portion, wherein the second member has a second pin hole formed therein at the shoulder portion, and wherein the first pin hole is adapted to be substantially aligned with the second pin hole at certain mated positions of the second member relative to the first member.

8. The bracket of claim 1, further comprising:
    an extension member, the extension member having a fist end and a second end, the extension member having a third threaded portion at the first end and having a fourth threaded portion at the second end, wherein the third threaded portion is adapted to me with the first threaded portion, and wherein the fourth threaded portion is adapted to mate with the second threaded portion.

9. The bracket of claim 1, wherein each of the stud holes is adapted to accept a stud having a diameter approximately equal to a diameter for a wheel stud of a standardized stud size of the vehicle.

10. The bracket of claim 1, wherein the stud holes are located at about a same radial distance from the first member.

11. The bracket of claim 1, wherein at least one of the stud holes intersects with an edge of the first plate portion.

12. The bracket of claim 1, wherein the first member extends substantially perpendicular from the fist plate portion.

13. The bracket of claim 1, wherein the second member extends substantially perpendicular from the second plate portion.

14. The bracket of claim 1, wherein the cylindrical shaped part of the first member has an outer diameter adapted to fit through a center hole of a factory alloy wheel.

15. The bracket of claim 1, wherein the container holder is adapted to retain a fuel container.

16. The bracket of claim 1, wherein the first member is welded to the first plate portion.

17. The bracket of claim 1, wherein the second member is welded to the second plate portion.

18. A bracket adapted to fit through a wheel of a spare tire for a vehicle, comprising:

a first plate portion having stud holes formed therethrough and adapted to be arranged in a pattern corresponding to a wheel-stud pattern for at least one vehicle;

a first member welded to the first plate portion and extending substantially perpendicular therefrom, wherein the first member is generally cylindrical shaped, and wherein the first member has threaded hole formed therein along a first longitudinal axis of the first member;

a recessed portion formed in a distal end of the first member;

a second plate portion having attachment holes formed therethrough and adapted to be arranged in a pattern corresponding to attachment points on a container holder;

a second member welded to the second plate portion and extending substantially perpendicular therefrom;

a shoulder portion formed on the second member, wherein the shoulder portion is adapted to mate with the recessed portion;

a thread shaft portion extending from a distal end of the second member along a second longitudinal axis of the second member, wherein the threaded shaft portion is adapted to mate with the threaded hole, wherein the first longitudinal axis is substantially aligned with the second longitudinal axis when the threaded shaft portion is mated with the threaded hole.

19. A container holder kit attachable to a spare tire support member on a vehicle, wherein the spare tire support member has wheel studs extending therefrom, wherein the wheel studs are adapted to engage with lug nuts to retain a wheel of a spare tire on the spare tire support member, the wheel studs being arranged in a pattern corresponding to a wheel stud hole pattern of the wheel, the kit comprising:

a container holder bracket adapted to retain a container;

an intermediate bracket comprising:

a first plate portion having a first set of holes formed therethrough, the first set of holes being arranged so that the wheel studs on the spare tire support member can pass through the fist set of holes, wherein the first plate portion is adapted to be attached to the spare tire support member using the wheel studs and lug nuts when the intermediate bracket is operably installed;

a first member extending from the first plate portion, wherein at least part of an exterior surface of the first member has a cylindrical shape, wherein the first member is adapted to fit through a center hole of the wheel when the intermediate bracket is operably installed, and wherein the first member has a first threaded portion;

a second plate portion being adapted for attachment to the container holder; and a second member extending from the second plate portion, wherein the second member has a second threaded portion, and wherein the first threaded portion is adapted to mate with the second threaded portion.

20. The kit of claim 19, wherein the attachment points on the second plate portion are attachment holes formed in the second plate portion.

21. The kit of claim 19, wherein the attachment points on the ed plate portion are attachment studs extending from the second plate portion.

22. The kit of claim 19, wherein the container is a gas can.

* * * * *

UNITED STATES PATENT AND TRADEMARK OFFICE
CERTIFICATE OF CORRECTION

PATENT NO. : 6,910,669 B2  Page 1 of 1
DATED : June 28, 2005
INVENTOR(S) : Gates et al.

It is certified that error appears in the above-identified patent and that said Letters Patent is hereby corrected as shown below:

Column 3,
Line 55, between "the" and "FIG." insert -- prior art; --.

Column 10,
Line 39, delete "ed" and insert -- second --.

Signed and Sealed this

Thirteenth Day of September, 2005

JON W. DUDAS
*Director of the United States Patent and Trademark Office*